United States Patent
Weaver (10) Patent No.: US 7,650,368 B2
(45) Date of Patent: Jan. 19, 2010

(54) METHODS, SYSTEMS, AND PRODUCTS FOR RESTORING ELECTRONIC MEDIA

(75) Inventor: Timothy H. Weaver, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 308 days.

(21) Appl. No.: 11/703,565

(22) Filed: Feb. 7, 2007

(65) Prior Publication Data

US 2008/0189338 A1 Aug. 7, 2008

(51) Int. Cl.
*G06F 17/00* (2006.01)

(52) U.S. Cl. ............................................ 707/202

(58) Field of Classification Search ............... None
See application file for complete search history.

(56) References Cited

U.S. PATENT DOCUMENTS

| | | | |
|---|---|---|---|
| 4,903,130 A | 2/1990 | Kitagawa et al. | |
| 5,255,180 A | 10/1993 | Shinoda et al. | |
| 5,313,282 A | 5/1994 | Hayashi | |
| 5,331,354 A | 7/1994 | Koyama et al. | |
| 5,652,615 A | 7/1997 | Bryant et al. | |
| 5,731,764 A | 3/1998 | Tanaka | |
| 5,774,170 A | 6/1998 | Hite et al. | |
| 6,006,257 A | 12/1999 | Slezak | |
| 6,009,409 A | 12/1999 | Adler et al. | |
| 6,078,589 A | 6/2000 | Kuechler | |
| 6,237,022 B1 | 5/2001 | Bruck | |
| 6,252,588 B1 | 6/2001 | Dawson | |
| 6,307,550 B1 | 10/2001 | Chen | |
| 6,317,165 B1 | 11/2001 | Balram | |
| 6,324,182 B1 | 11/2001 | Burns | |
| 6,345,293 B1 | 2/2002 | Chaddha | |
| 6,446,261 B1 | 9/2002 | Rosser | |
| 6,460,075 B2 | 10/2002 | Krueger | |
| 6,591,423 B1 | 7/2003 | Campbell | |
| 6,647,411 B2 | 11/2003 | Towell | |
| 6,698,020 B1 | 2/2004 | Zigmond et al. | |
| 6,757,796 B1 | 6/2004 | Hofmann | |
| 6,771,644 B1 | 8/2004 | Brassil et al. | |
| 6,791,622 B2 | 9/2004 | Zeidler | |
| 6,862,666 B2 | 3/2005 | Chong et al. | |
| 6,870,463 B2 | 3/2005 | Dresti et al. | |
| 6,882,793 B1 | 4/2005 | Fu | |
| 6,963,903 B2 | 11/2005 | Krueger | |
| 7,246,275 B2 * | 7/2007 | Therrien et al. | ............. 714/710 |
| 7,444,682 B2 | 10/2008 | Li et al. | |
| 2002/0028026 A1 | 3/2002 | Chen | |
| 2002/0108127 A1 | 8/2002 | Lew | |
| 2002/0112005 A1 | 8/2002 | Namias | |
| 2002/0133830 A1 | 9/2002 | Kim | |
| 2003/0058277 A1 * | 3/2003 | Bowman-Amuah | ......... 345/765 |
| 2003/0067554 A1 | 4/2003 | Klarfeld | |
| 2003/0088687 A1 | 5/2003 | Begeja | |
| 2003/0088878 A1 | 5/2003 | Rogers | |

(Continued)

*Primary Examiner*—Uyen T. Le
(74) *Attorney, Agent, or Firm*—Scott P. Zimmerman PLLC (57) ABSTRACT

Methods, devices, and products are disclosed for restoring media. A media catalog is received and stored. When restoration is desired, an identity of a media file is retrieved, a peer contact list is accessed, and a preferred ranking of the peers is retrieved. A query is sent to a preferred address. When a free copy of the media is unobtainable from a peer, then a fee-based restoration service is queried.

13 Claims, 10 Drawing Sheets

U.S. PATENT DOCUMENTS

| | | |
|---|---|---|
| 2003/0120680 A1* | 6/2003 | Agrawal et al. ......... 707/103 R |
| 2003/0139134 A1 | 7/2003 | Bailey et al. |
| 2004/0031058 A1 | 2/2004 | Reisman |
| 2004/0078814 A1 | 4/2004 | Allen |
| 2004/0131357 A1 | 7/2004 | Farmer et al. |
| 2004/0210944 A1 | 10/2004 | Brassil et al. |
| 2004/0255336 A1 | 12/2004 | Logan |
| 2004/0268407 A1 | 12/2004 | Sparrell et al. |
| 2004/0268410 A1 | 12/2004 | Barton |
| 2005/0081252 A1 | 4/2005 | Chefalas |
| 2006/0029093 A1 | 2/2006 | Van Rossum |
| 2006/0080741 A1* | 4/2006 | Nair ........................... 726/26 |
| 2007/0083556 A1* | 4/2007 | Plastina et al. ........... 707/104.1 |
| 2007/0133953 A1* | 6/2007 | Fontijn et al. ............... 386/126 |

* cited by examiner

METHODS, SYSTEMS, AND PRODUCTS FOR RESTORING ELECTRONIC MEDIA

CROSS-REFERENCE TO RELATED APPLICATIONS

This application relates to the following concurrently filed and commonly-assigned applications, with each application incorporated herein by reference: U.S. application Ser. No. 11/703,352; U.S. application Ser. No. 11/413,886; U.S. application Ser. No. 11/413,885; and U.S. application Ser. No. 11/703,325.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to restoring stored media.

Hard drives, and other memory devices, sometimes fail. The fear of failure haunts anyone who stores business data, precious home movies, pictures, and any other media content. As digital video recorders grow in popularity, for example, more and more users have a significant investment in a library of media stored to their recorder. Should the digital recorder experience a memory or other hardware failure, and some or all of that library is lost, the user may lose media of significant value. What is needed, then, are methods, systems, and products that provide a restoration service for recorded media.

SUMMARY

The aforementioned problems, and other problems, are reduced, according to exemplary embodiments, by methods, systems, and products that restore media. Exemplary embodiments describe how peer devices may be queried to restore a user's digital media. When stored media is not retrievable, exemplary embodiments may query one or more peer devices to obtain another copy of the stored media. Exemplary embodiments may also allow the user to obtain a restoration service from a service provider. The term "media" includes, but is not limited to, movies, pictures, images, music, text, programs, and data. Whenever the user attempts to access a media file that is irretrievable, for any reason, exemplary embodiments attempt to obtain that media file from peer devices and/or from a service provider's restoration server.

Exemplary embodiments describe a method for restoring media in a media library stored in a user's memory device. A catalog of the media stored on the user's memory device is received at a restoration server, wherein the catalog of the recorded media files is mirrored to the restoration server. When restoration is desired for one or more of the media files in the catalog, a peer contact list may be accessed and a peer query is sent to one or more peer devices requesting media that can be used to restore lost or corrupted media file(s).

More exemplary embodiments describe a system for restoring media. The system is operable to receive a user's media catalog and to store the media catalog in a database of media catalogs. When restoration is desired, the user's media catalog is retrieved that describes an identity of a media file to be restored. The database of media catalogs is queried for another media catalog that describes the same identity of the media file. A communications address associated with the another media catalog is retrieved.

Still more exemplary embodiments describe a computer program product for restoring media. The computer program product has processor-executable instructions for receiving a user's media catalog and storing the media catalog in a database of media catalogs. When restoration is desired, the user's media catalog is retrieved that describes an identity of a media file to be restored. The database of media catalogs is queried for another media catalog that describes the same identity of the media file. A communications address associated with the another media catalog is retrieved.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
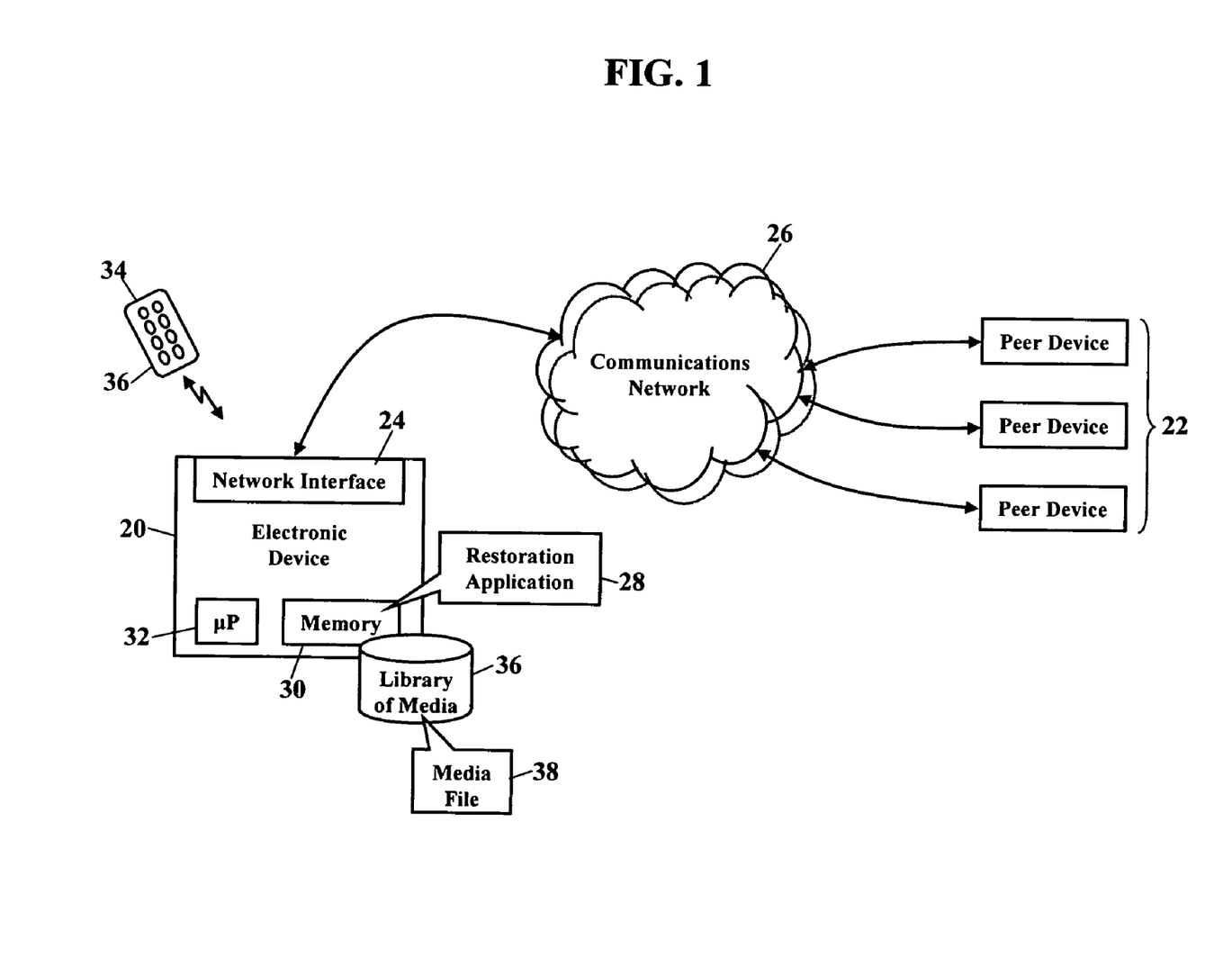
FIG. 1 is a schematic illustrating an operating environment, according to exemplary embodiments.

FIG. 1 is a schematic illustrating an operating environment, according to exemplary embodiments. FIG. 1 illustrates a user's electronic device 20 communicating with one or more peer devices 22 via a network interface 24 to a communications network 26. Although the user's electronic device 20 is generically shown, as later paragraphs will explain, the electronic device 20 may be a computer, set-top box, digital recorder, or any other communications device. The user's electronic device 20 stores a restoration application 28 in memory 30. According to exemplary embodiments, the restoration application 28 includes processor-executable code or instructions that cause a processor 32 to restore any media (e.g., movie, music, and/or image). The processor 32 also communicates with a user interface 34 for indicating what media is to be restored. The user interface 34 is illustrated as a remote control 36, but the user interface 34 may be a control panel, keypad, keyboard, display, or any other means for receiving spoken or tactile inputs. The processor 32 receives an input via the user interface 34, and the input may instruct the processor to restore some entry in a library 36 of media. The library 36 of media contains movies, music, photos, data files, or any other files or content stored or recorded by the user. Although the library 36 of media may contain hundreds, if not thousands of files, the library 36 of media is simply illustrated as containing a media file 38. Whenever the user wishes to enjoy or experience the media file 38, the user selects the media file 38 for processing and for presentation.

Sometimes, however, restoration is needed. When the user attempts to retrieve the recorded/stored media file 38, the media file 38 may not be retrievable. The media file 38 may be corrupted or the memory 30 may be damaged. The media file 38 may be incompatible, there may be checksum errors, or the pathname may be nonexistent. There are, in fact, numerous software and hardware problems that may cause the stored media file 38 to be irretrievable. Whatever the reason(s), the user may be unable to retrieve the stored media file 38 from the memory 30. Exemplary embodiments thus describe how the irretrievable media file 38 may be restored, thus allowing the user to obtain a new electronic copy of the media file 38.

The user's electronic device 20 is only simply illustrated. Because the architecture and operating principles of user's electronic device 20 are well known, the hardware and software components of the user's electronic device 20 are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 2:
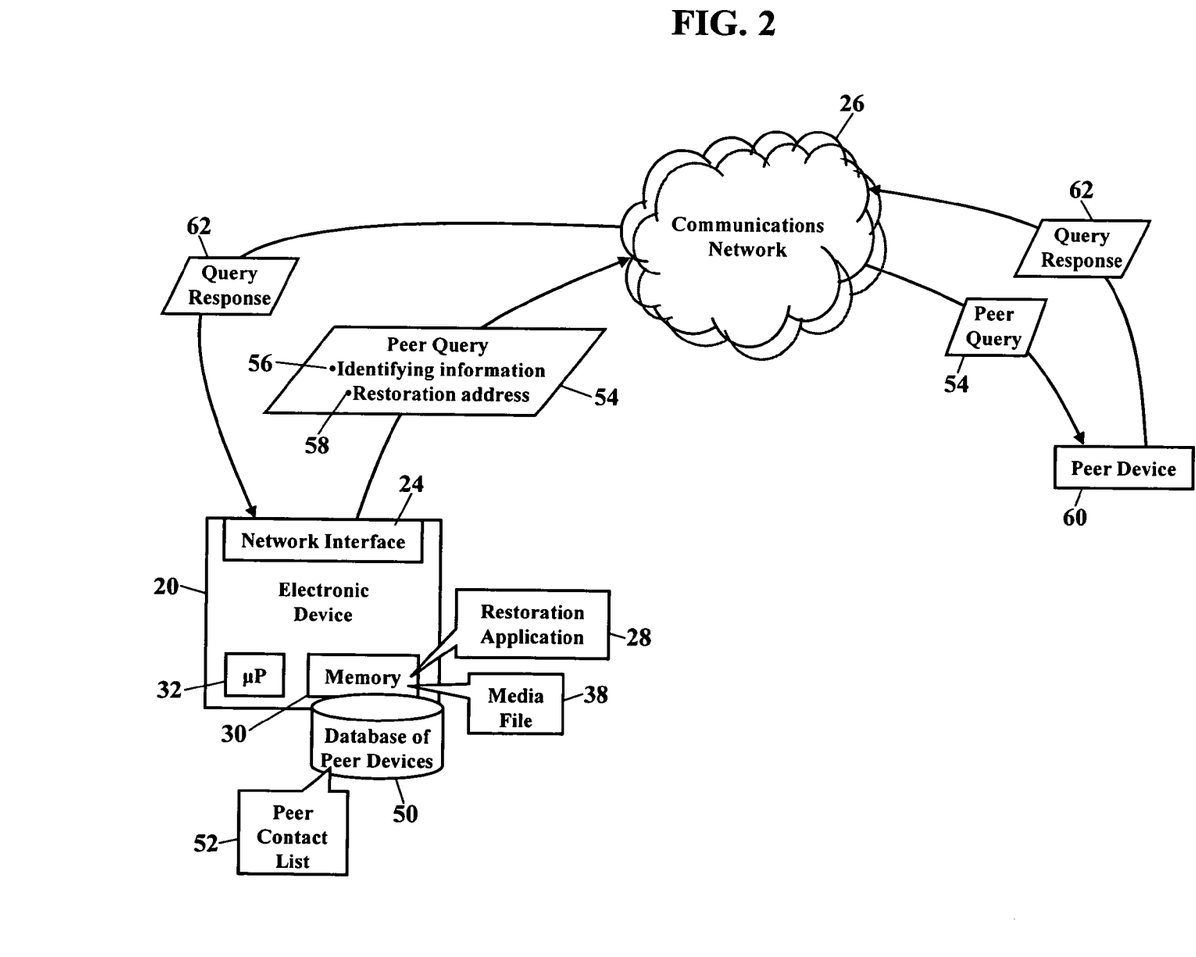
FIG. 2 is a schematic illustrating peer queries, according to more exemplary embodiments.

FIG. 2 is a schematic illustrating peer queries, according to more exemplary embodiments. Here the restoration application 28 queries the one or more peer devices 60 to obtain a new electronic copy of the media file 38. Whenever the stored media file 38 must be restored, the restoration application 28 may instruct the processor 32 to access a database 50 of peer devices. The database 50 of peer devices may be locally stored in the memory 30, or the database 50 of peer devices may be remotely accessible via the communications network 26. The database 50 of peer devices may store one or more peer contact lists 52. According to exemplary embodiments, each peer contact list 52 comprises one or more device addresses and/or communications addresses from which the restoration application 28 may obtain a new electronic copy of the media file 38. The database 50 of peer devices, for example, may store a listing of I.P. addresses that correspond to friends' devices. The database 50 of peer devices may additionally or alternatively store email addresses for known contacts. The database 50 of peer devices may be obtained from the user's current or historical contact list. The user may configure or load the database 50 of peer devices with any communications addresses to be queried when restoration is needed.

Queries are then formed. The restoration application 28 may instruct the processor 32 to invoke the network interface 24 to communicate a peer query 54 to the peer device 60. The peer query 54 is sent to a communications address obtained from the database 50 of peer devices. The peer query 54 may contain identifying information 56 that describes the media to be restored. The peer query 54, for example, may describe the title of a movie, a filename, or even a universal code or number that uniquely identifies the media. The peer query 54 may additionally contain a restoration address 58 that identifies to what communications address the restored media is sent. Because the user may want the restored media sent to a different destination, the restoration address 58 identifies this alternative communications address.

The restoration application 28 may instruct the processor 30 to send the peer query 54 to any of the communications addresses contained in the database 50 of peer devices. FIG. 2, for simplicity, illustrates the peer query 54 communicating to the peer device 60 via the communications network 26. When the peer device 60 receives the peer query 54, the peer device 60 may determine whether the desired media (as identified by title or the other identifying information 56) is locally stored in the peer device 60. The peer device 60 may return a query response 62. The query response 62 communicates via the communications network 26 to the restoration application 28 operating in the user's electronic device 20. If the query response 62 indicates that the desired media may be obtained from the peer device 60, the restoration application 28 may negotiate with the peer device 60 to obtain the desired media to be restored. The restoration application 28, for example, may arrange for a file transfer/download of the desired media at an advantageous or opportune date/time.

The restoration application 28 may "flood" the database 50 of peer devices. The restoration application 28, for example, may be configured to "flood" the peer query 54 to multiple communications addresses in the database 50 of peer devices. That is, the restoration application 28 formats multiple peer queries and simultaneously (or nearly simultaneously) sends the queries. Because the multiple peer queries may be batch sent, multiple peer devices are queried for the media to be restored.

The restoration application 28 may hierarchically send the peer query 54. When the restoration application 28 accesses the database 50 of peer devices, the processor 32 may sequentially send the peer query 54. That is, the one or more peer contact lists 52 in the database 50 of peer devices may be hierarchically arranged. As the restoration application 28 accesses each peer contact list 52, the processor 32 works its way down the list and sequentially sends the peer query 54 to each communications address. The restoration application 28 may even be configured to await the query response 62 before attempting the next communications address in the peer contact list 52. Here, then, the user may establish a preferred ranking of sources when obtaining restoration copies of desired media. The most trusted/reliable sources would (presumedly) be first queried. Alternatively, the user may wish to first query "free" sources (e.g., friends and family) that may not charge a fee for the restoration copy. Perhaps only when a free electronic copy cannot be obtained would other peer devices (further down the peer contact list 52) be queried.

The restoration application 28 may categorically send the peer query 54. When the restoration application 28 accesses the database 50 of peer devices, the processor 32 may access contact lists or individual communications addresses that correspond to a category or genre of the desired media. Most media may be categorized by subject, genre, actor(s)/actress (es), setting, plot, director, location, or any other category. The user may associate individual communications addresses, or even an entire peer contact list, to any category. Suppose, for example, that the restoration application 28 needs to restore a horror movie. Even if the horror movie is irretrievable from the memory 30, the restoration application 28 may still have access to data or information that describes a category associated with the irretrievable media file 38. The restoration application 28 thus knows that the desired media is categorized as "horror," and the restoration application 28 may access a "horror" peer contact list 52 that is associated with the "horror" category. The "horror" peer contact list 52 contains peer communications addresses for which "horror" content is more likely obtainable. Because not all friends, family, and other peers are likely to store all categories/genres of media, the restoration application 28 may thus conserve processing time and not query peers who are unlikely to have the desired media.

Media files may be associated with a "category" data field. When the media file 38 is stored to the memory 30, the user may establish a category data field that is associated with the media file 38. The category data field, for example, may be established in a header associated with the file. The category data field may additionally or alternatively be added to a master file allocation table ("FAT"). However the category data field is configured, the restoration application 28 may be able to read or obtain the category data field, even if the media file 38 is not readable. So the restoration application 28 may retrieve a category associated with the media file 38, even though the file 38 itself is unreadable.

Communications addresses may also be associated with a "category" data field. When the user, for example, establishes or maintains the database 50 of peer devices, each communications address may be associated with a category. Each communications address in the database 50 of peer devices may include a data field or annotation for specifying one or more associated categories. If the user maintains a contacts folder, the user may additionally or alternatively associate a category data field to each contact's communications address. However the communications addresses are obtained, the restoration application 28 may obtain a category associated with a communications address.

The restoration application 28 may send the peer query 54 to a category of peer devices. The restoration application 28, as earlier explained, may be able to read or obtain a category data field associated with the media file 38 to be restored. The restoration application 28, as also above explained, may also obtain a category associated with any communications address listed in the database 50 of peer devices. The restoration application 28 may thus sort the database 50 of peer devices according to one or more categories of the media file to be restored. The restoration application 28 then instructs the processor 32 to send the peer query 54 to the sorted communications addresses in the database 50 of peer devices. The processor 32 may sequentially send the peer query 54, or the processor 32 may flood the peer query 54 to each communications address. The restoration application 28 thus conserves processing time, bandwidth, and perhaps even connection charges by not querying peers who are unlikely to have the desired media. The restoration application 28 reduces the amount of traffic in the communications network 26, and the restoration application 28 also reduces the amount of messages received by those peers not likely to have the desired media.

Figure 3:
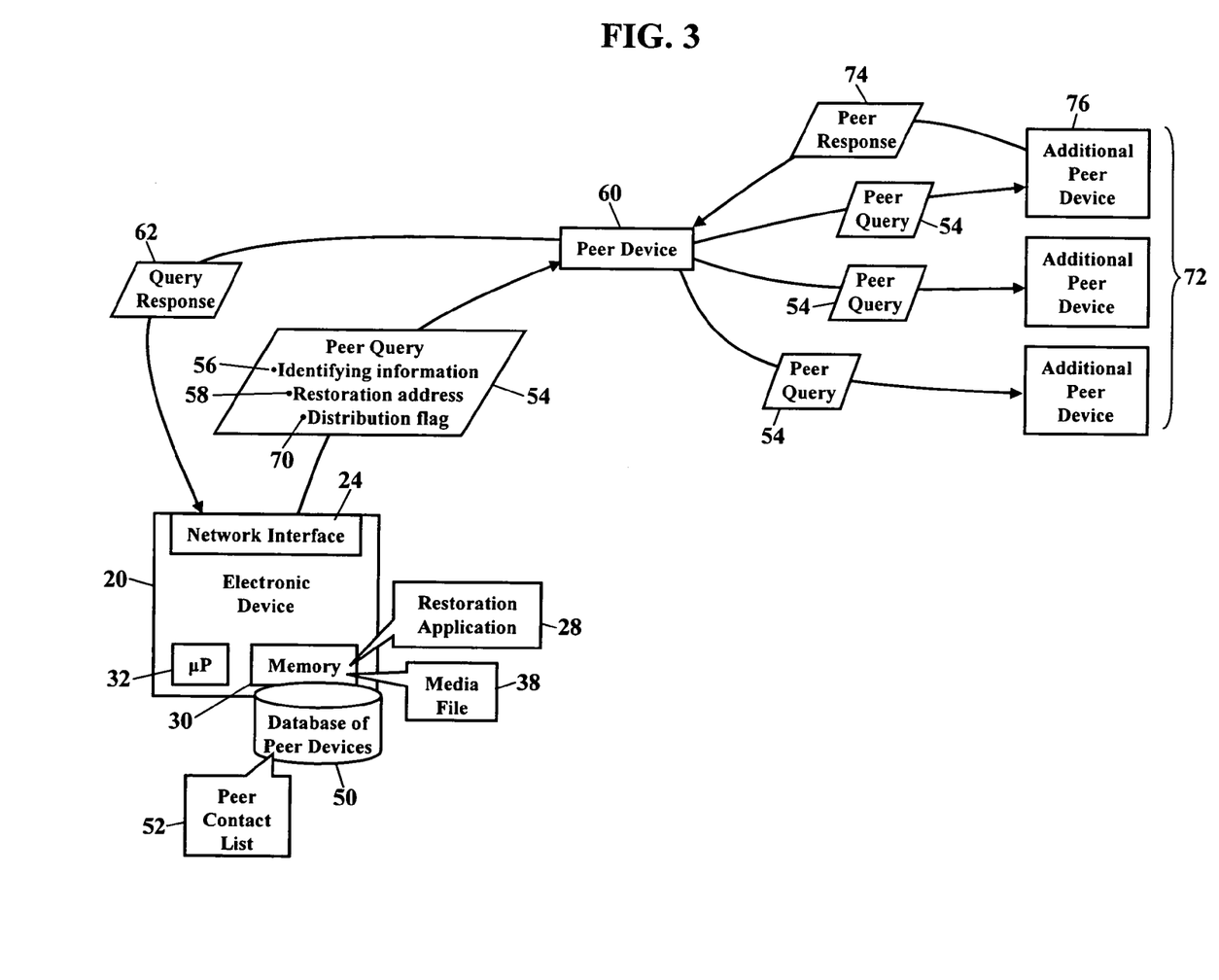
FIG. 3 is a schematic illustrating additional peer queries, according to even more exemplary embodiments.

FIG. 3 is a schematic illustrating additional peer queries, according to even more exemplary embodiments. Here the restoration application 28 may authorize distribution of the peer query 54 to other devices. The restoration application 28 sends the peer query 54 (via the communications network 26 illustrated in FIG. 1) to any of the communications addresses contained in the database 50 of peer devices. FIG. 3, for simplicity, illustrates the peer query 54 communicating to the peer device 60. The peer device 60 determines whether the desired media (as identified by title or the other identifying information 56) is locally stored in the memory of the peer device 60. If the peer device 60 does not store the desired media, the peer device 60 may check to see whether distribution is authorized. That is, the peer device 60 checks to see whether the peer query 54 may be forwarded or distributed from the peer device 60 to other devices. When the peer device 60 does not store the desired media, the peer device 60 may inspect the peer query 54 for a distribution flag 70. The distribution flag 70 determines whether the peer device 60 may query other devices for the same media to be restored. The restoration application 28 may obtain faster query results when the peer query 54 propagates or "fans out" to as many devices as possible. If the distribution flag 70 permits, the peer device 60 may itself forward the peer query 54 to additional devices 72. The peer device 60 may access its own contacts list and forward the peer query 54 to any communications address in the contact list. The distribution flag 70 may even reference a category of addresses to which the peer query 54 may be forwarded (as above explained). When the peer device 60 forwards the peer query 54 to the additional peer devices 72, the peer device 60 may itself receive a peer response 74. If the peer response 74 indicates that an additional device 76 stores the desired media to be restored, the peer device 60 may report back to the restoration application 28. The peer device 60 sends the query response 62 describing the additional peer device 76 from which the desired media is obtainable. The query response 62 may include the communications address of the additional peer device 76, and the restoration application 28 may then negotiate with that additional peer device 76, and/or with the peer device 60, to transfer/download the desired media to be restored. If, however, the query response 62 indicates that none of the additional peer devices 72 stores the desired media, the distribution flag 70 may again indicate whether any of the additional peer devices 72 may, in turn, forward the peer query 54 to still more devices.

Figure 4:
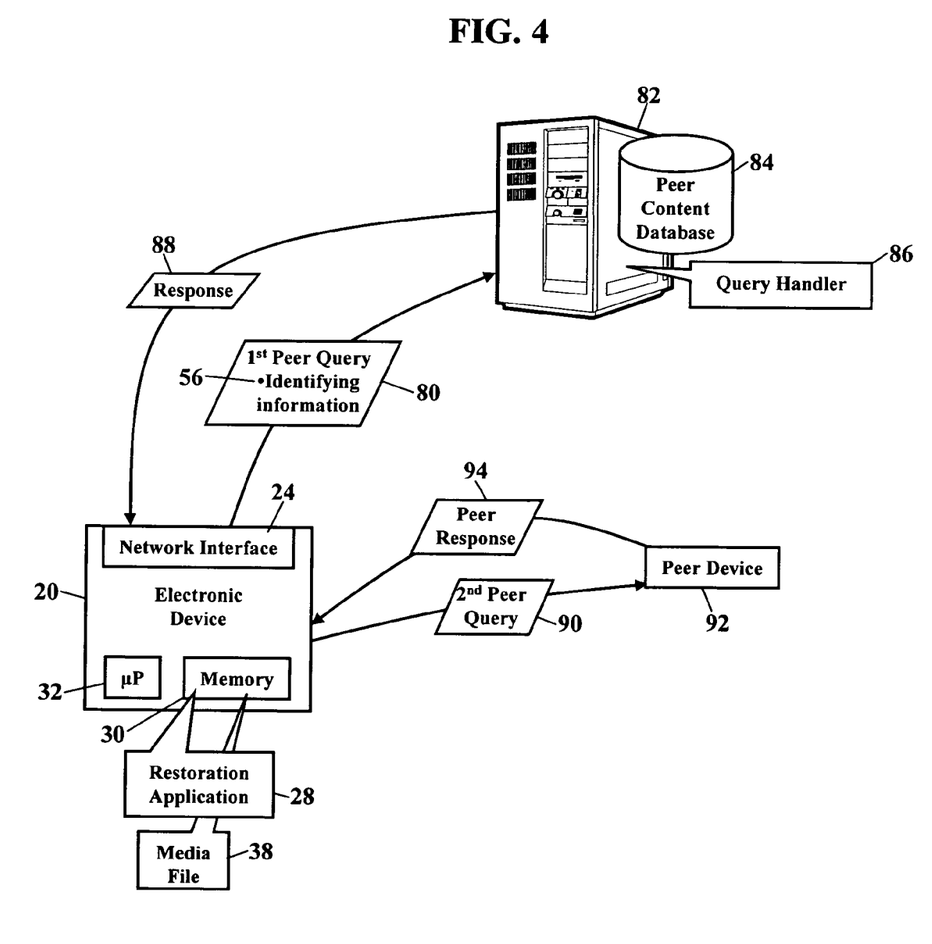
FIG. 4 is a schematic illustrating an alternative process for a peer-to-peer environment, according to still more exemplary embodiments.

FIG. 4 is a schematic illustrating an alternative process for a peer-to-peer environment, according to still more exemplary embodiments. Here the restoration application 28 sends a first peer query 80 (via the communications network 26 illustrated in FIG. 1) to a communications address associated with a peer server 82. The peer server 82 stores a peer content database 84 that maps, relates, or otherwise associates content subject matter to peer devices. The peer server 82 acts as a "gathering place" about which peer devices swarm for content. When a device connects to the peer server 82 and submits to a content evaluation, the peer server 82 determines what content is available from that device. The peer server 82 is then able to match peers together to enable content to be found and retrieved.

The peer server 82 receives the first peer query 80. A query handler 86 queries the peer content database 84 for the identifying information 56 that describes the media to be restored. The peer server 82 thus determines what peer devices are likely to store the desired media. The query handler 86 then sends a response 88 that contains the query results. The response 88, for example, may contain a peer communications address for each identified peer device that may store the desired media. When the restoration application 28 receives the response 88, the restoration application 28 may cause the processor 32 to visually and/or audibly present a username and communications address for each peer device. The user may then individually select any peer device from which the desired content may be retrieved. The restoration application 28 may alternatively be configured to automatically query each communications address listed in the response 88. Regardless, the restoration application 28 sends a second peer query 90 (via the communications network 26 illustrated in FIG. 1). The second peer query 90 communicates to any of the communications addresses identified in the response 88. FIG. 4, for simplicity, illustrates the second peer query 90 communicating to a peer device 92. The restoration application 28 awaits a peer response 94, and the peer response 94 identifies whether the desired media is obtainable from the peer device 92. If the desired media is obtainable, the restoration application 28 may then negotiate to transfer/download the desired media to be restored. FIG. 4, then, illustrates a peer-to-peer environment in which the peer server 82 brokers content queries to determine what peer devices are likely to restore the desired media.

Figure 5:
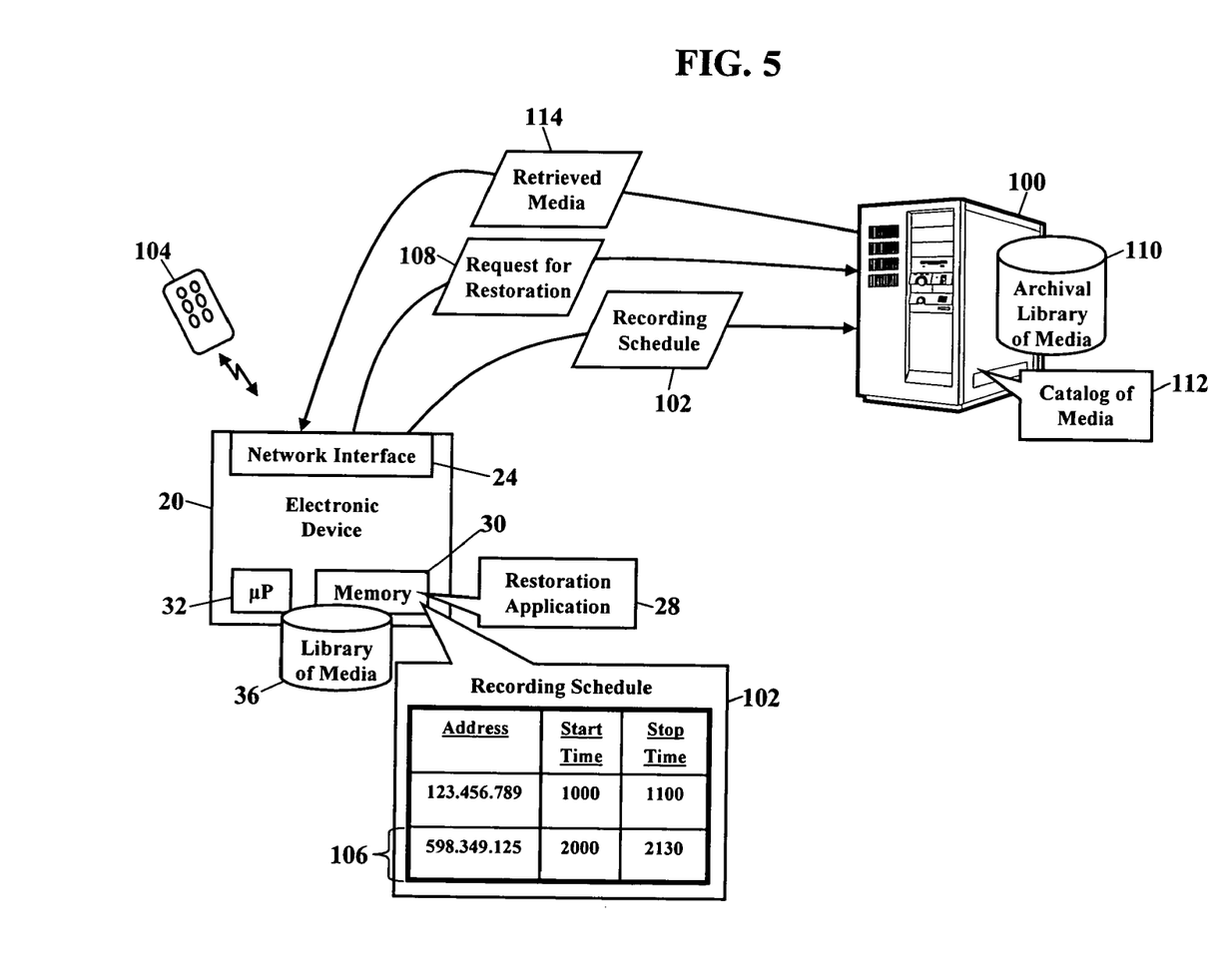
FIG. 5 is a schematic illustrating restoration of media by a restoration server, according to even more exemplary embodiments.

FIG. 5 is a schematic illustrating the restoration of media by a restoration server 100, according to even more exemplary embodiments. Here the restoration application 28 may query the restoration server 100 (via the communications network 26 illustrated in FIG. 1) to obtain a restored electronic copy of the desired media. The restoration server 100 maintains a full or partial archive of media on the user's behalf. When restoration is needed, the restoration application 26 may then obtain restored media from the restoration server 100.

According to exemplary embodiments, the restoration server 100 mirrors the user's library 36 of media. The user's library 36 of media may contain movies, music, photos, data files, or any other files or content stored or recorded by the user. The restoration application 28 automatically and/or periodically instructs the processor 32 to archive the user's library 36 of media to the restoration server 100. Here, however, the restoration application 28 may also archive or mirror a user's recording schedule 102. Whenever the user desires to schedule recording of a programming event or media, the processor 32 may inform the restoration server 100. The restoration server 100 is thus able to archive media that the user has scheduled for future recording/storage. As FIG. 5 illustrates, when the user makes inputs via a user interface 104 to record media, an entry 106 is created in the recording schedule 102. The restoration application 28 then instructs the processor 32 to invoke the network interface 24 to communicate the recording schedule 102 to the restoration server 100. The processor 30 thus sends the recording schedule 102 (via the communications network 26 shown in FIG. 1) to the restoration server 100. Because the restoration server 100 mirrors the recording schedule 102, any media scheduled for recording is also recorded and archived by the restoration server 100. Mirroring of the recording schedule 102 is more fully described in the concurrently filed and commonly-assigned U.S. application Ser. No. 11/413,886, concurrently filed herewith and entitled "Methods, Systems, and Products for Recording Media", and incorporated herein by reference in its entirety.

When restoration is needed, the restoration application 28 may consult the restoration server 100. When the restoration application 28 determines that media needs to be restored, the restoration application 28 may query the restoration server 100 to obtain that media. The restoration application 28 instructs the processor 32 to format a request 108 for restoration. The request 108 for restoration communicates to a communications address associated with the restoration server 100 (via the communications network 26 shown in FIG. 1). The request 108 for restoration may also include the identifying information (shown as reference numeral 56 in FIG. 2) that identifies the media to be restored. The request 108 for restoration may also include the restoration address (shown as reference numeral 58 in FIG. 2) that identifies to what communications address the restored media is sent. The restoration server 100 accesses an archival library 110 of media to retrieve the archived media. Because a unique archival library for each user may require a large amount of memory, the restoration server 100 may simply maintain a smaller catalog 112 of media for each user. The catalog 112 of media may only contain a listing of titles or filenames corresponding to each user's library of media. The restoration server 100 may confirm that the desired media is listed in the user's corresponding catalog 112 of media. If so, the restoration server then retrieves the desired media from the archival library 110 of media. Retrieved media 114 is communicated to user's electronic device 20 (or to the restoration address 58, if specified). The restoration server 100 may send the retrieved media 114 during off-peak hours to repopulate the user's library 36 of media. The restoration server 100 may even utilize multicast streaming to simultaneously restore multiple devices. The restoration server 100 may alternatively utilize unicast streaming to individually restore each device. The restoration server 100 may access any programming logic to decide whether unicast or multicast streaming more efficiently accomplishes the restoration.

Figure 6:
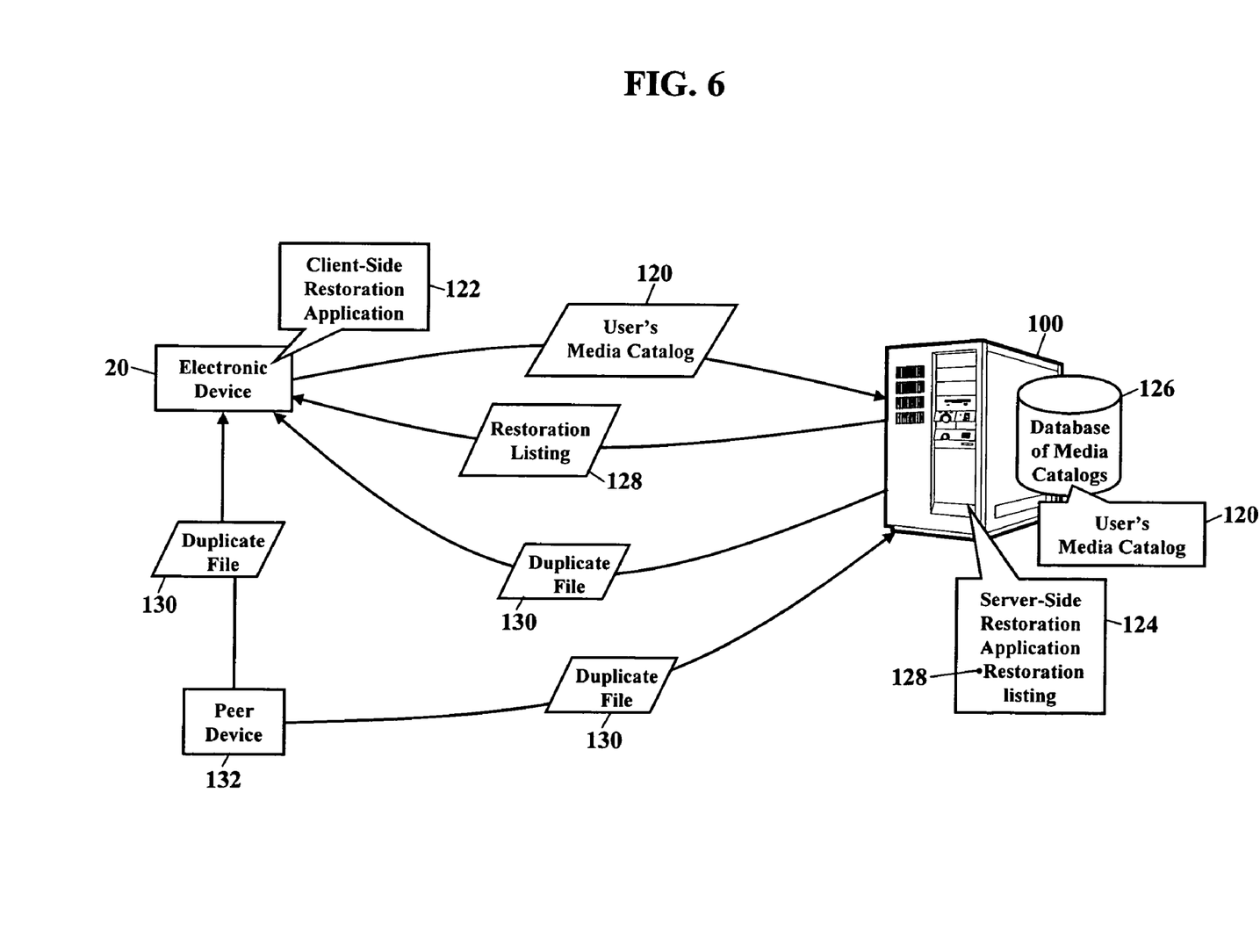
FIG. 6 is a schematic further illustrating a peer-to-peer environment for the restoration of media, according to still more exemplary embodiments.

FIG. 6 is a schematic further illustrating a peer-to-peer environment for the restoration of media, according to still more exemplary embodiments. Here the restoration server 100 maintains a copy or replica of a user's media catalog 120. The user's media catalog 120 generally or exactly describes the files stored on the user's electronic device 20. When a user's media file is lost or corrupted, the restoration server 100 may then arrange transfers of media files between peer devices, thus reducing the memory needed to maintain a complete archive of the user's files. As FIG. 6 illustrates, a client-side restoration application 122 periodically or randomly sends the user's media catalog 120 to the restoration server 100. A server-side restoration application 124 stores the user's media catalog 120 in a database 126 of media catalogs. The database 126 of media catalogs maintains an archived back-up of each user's media catalog. That is, the database 126 of media catalogs archives, or mirrors, a back-up media catalog (or file directory) for each subscribing user and/or each subscribing user's device. The database 126 of media catalogs may even archive media catalogs for other storage devices (such as network storage servers and third-party databases). The database 126 of media catalogs is illustrated as being locally stored in the restoration server 100, yet the database 126 of media catalogs may be remotely maintained and accessed at some other device in the communications network (shown as reference numeral 26 in FIG. 1).

When restoration is needed, the server-side restoration application 124 may consult the database 126 of media catalogs. Because the user's media catalog 120 is archived to the database 126 of media catalogs, the server-side restoration application 124 may retrieve a duplicate version of the user's media catalog 120. The server-side restoration application 124 thus knows what files were stored on the user's electronic device 20.

The restoration server 100 may then determine from where files may be obtained. The server-side restoration application 124 may compare the user's media catalog 120 to other entries in the database 126 of media catalogs. When the server-side restoration application 124 retrieves the user's media catalog 120, the server-side restoration application 124 knows the identities (e.g., filenames) of the media files to be restored. The server-side restoration application 124 may then query the database 126 of media catalogs for other media catalogs that have the same media identities. The server-side restoration application 124 thus obtains a restoration listing 128 of every device that stores a duplicate copy of a needed file. The restoration listing 128 may include a communications address (such as an I.P. address) of each device. The server-side restoration application 124 may thus identify peer devices (e.g., other users' devices and/or network devices) from which duplicate media files may be obtained. The restoration service may be subscription-based, in which subscribers grant authorization for their devices to be cataloged for restoration purposes.

The restoration server 100 may then assist in a restoration service. Once the restoration listing 128 is developed, the server-side restoration application 124 may send the restoration listing 128 to the user's electronic device 20. The client-side restoration application 122 may then query each device in the restoration listing 128 and arrange for a transfer of a desired, duplicate file 130. Here, then, the user's device 20 directly interfaces with a peer device 132 to obtain the duplicate file 130. The user's device 20 and the peer device 132 negotiate to determine how and when the transfer will occur. This peer-to-peer approach, however, may be too complex for the user's electronic device 20. The user's electronic device 20, for example, may have limited processing capabilities and limited memory to accommodate a complex programming application.

The restoration server 100, then, may broker the restoration service. The restoration server 100 may direct or manage the file transfer on behalf of the user's electronic device 20 and/or the peer device 132. Once the restoration listing 128 is developed, the server-side restoration application 124 may direct a file transfer of the duplicate file 130. Because the restoration server 100 may know at all times what media is stored on what device, the server-side restoration application 124 may broker the file transfer process. The server-side restoration application 124, for example, may arrange a transfer of the duplicate file 130 to the user's electronic device 20. The server-side restoration application 124 may direct the peer device 132 to transfer or send the duplicate file 130 directly to the user's electronic device 20. The server-side restoration application 124, instead, may direct the peer device 132 to transfer the duplicate file 130 to the restoration server 100 (or some other intermediary device). The restoration server 100 and the user's electronic device 20 may then negotiate a transfer of the duplicate file 130 to the electronic device 20. This approach relieves the user's electronic device 20 from complex tasks, and the user's electronic device 20 need only have simpler file transfer protocol processing capabilities.

Exemplary embodiments may utilize spare bandwidth. The restoration process may restore files during periods of lesser, or least, bandwidth demand in the communications network (shown as reference numeral 26 in FIG. 1). Because the transfer of files may occur during early morning hours, for example, the restoration service may not overly load the communications network and, thus, jeopardize the performance of the communications network's primary media distribution function.

Figure 7:
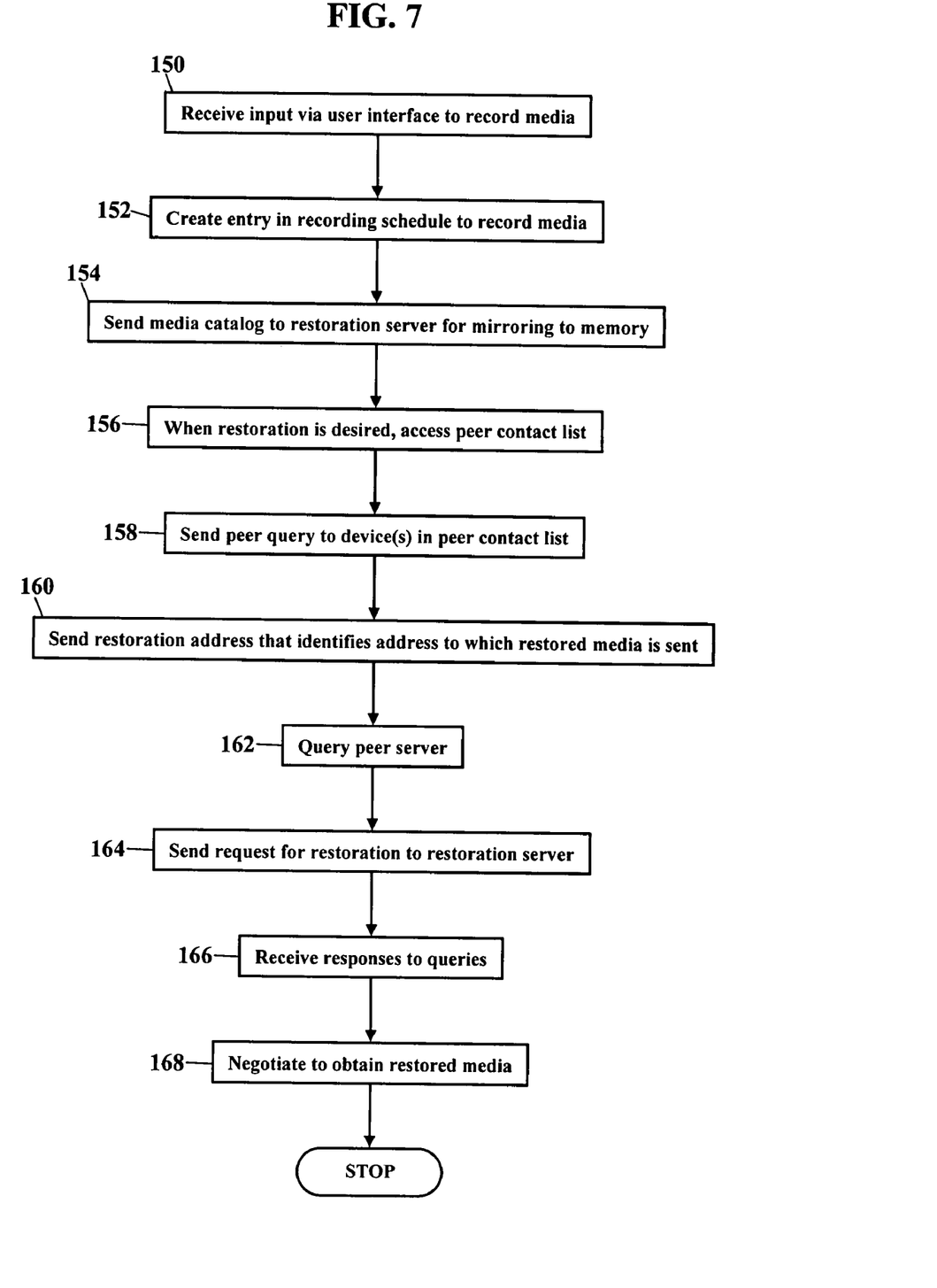
FIG. 7 is a flowchart illustrating a method for restoring media, according to more exemplary embodiments.

FIG. 7 is a flowchart illustrating a method for restoring media, according to more exemplary embodiments. An input is received via a user interface to record media (Block 150). An entry is created in a recording schedule to record the media (Block 152). The recording schedule is used to control the recording of media on the user's memory device. A media catalog of the media stored on the user's memory device is sent to a restoration server, wherein the media catalog is mirrored to the restoration server (Block 154). When restoration is desired for one or more of the media files in the catalog, a peer contact list is accessed (Block 156). A peer query is then sent to one or multiple peer devices in the peer contact list (Block 158). The peer query queries each peer device for the media. A restoration address may also be sent that identifies to what communications address the restored media is sent (Block 160). A peer server may be queried for the media to be restored (Block 162). A request for restoration may be sent to the restoration server to have the media restored (Block 164). Responses to the queries are received (Block 166). Negotiation is then commenced to download or transfer the desired media (Block 168).

Figure 8:
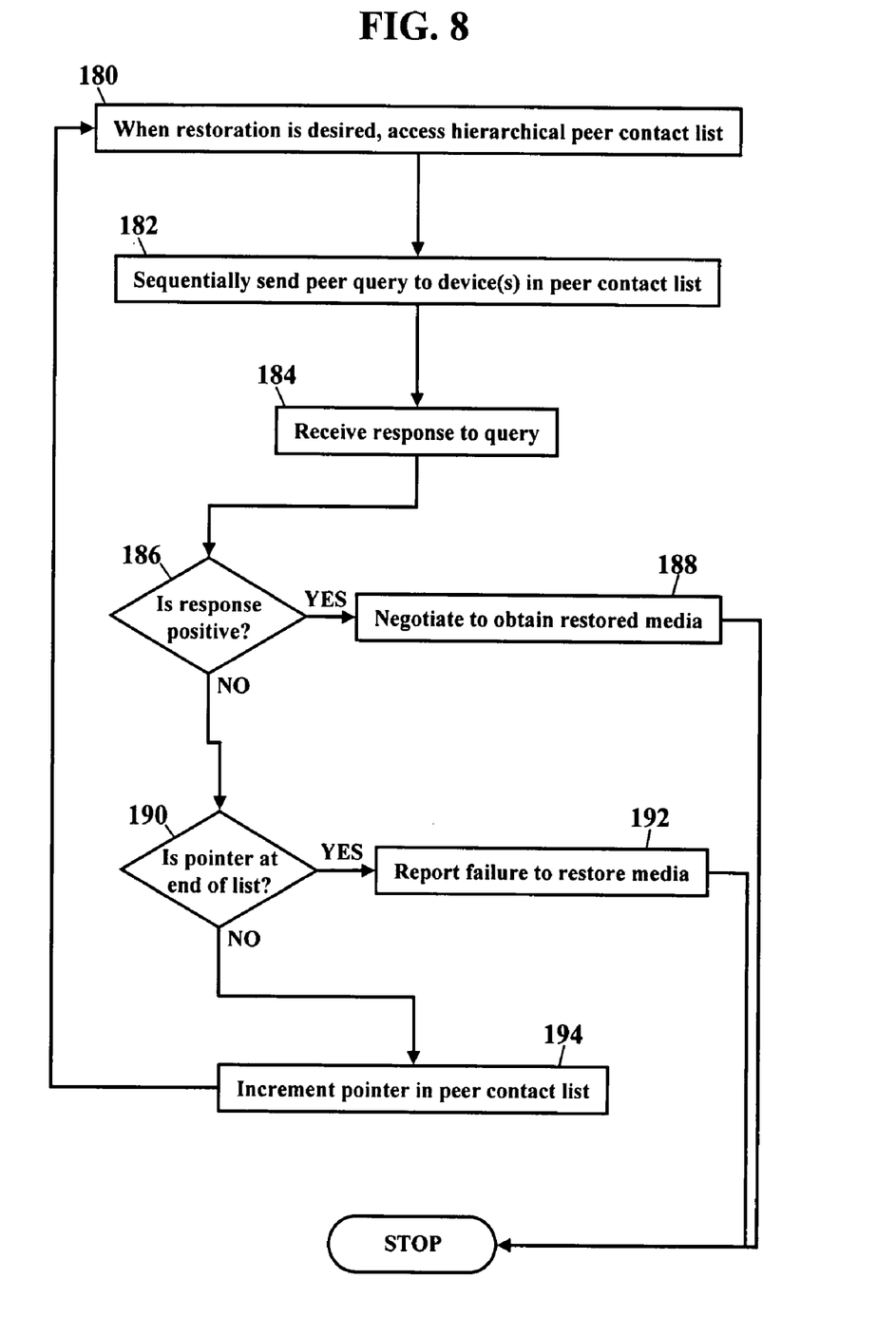
FIG. 8 is a flowchart illustrating another method for restoring media, according to even more exemplary embodiments.

FIG. 8 is a flowchart illustrating another method for restoring media, according to even more exemplary embodiments. When restoration is desired, a hierarchical peer contact list is accessed (Block 180). A peer query is sequentially sent to each peer device (Block 182) and a response is received (Block 184). If the response is positive, indicating the media to be restored is obtainable (Block 186), then negotiation is then commenced to download or transfer the desired media (Block 188). If, however, the response is negative (Block 186), then the position of a pointer checked against a last entry in the peer contact list (Block 190). If the pointer is at a last entry in the peer contact list (Block 190), then a restoration failure is report (Block 192). If, however, the pointer is not at the end of the peer contact list (Block 190), then the pointer is moved/incremented to the next entry in the peer contact list (Block 194). The method again accessed the hierarchical peer contact list (Block 180).

Figure 9:
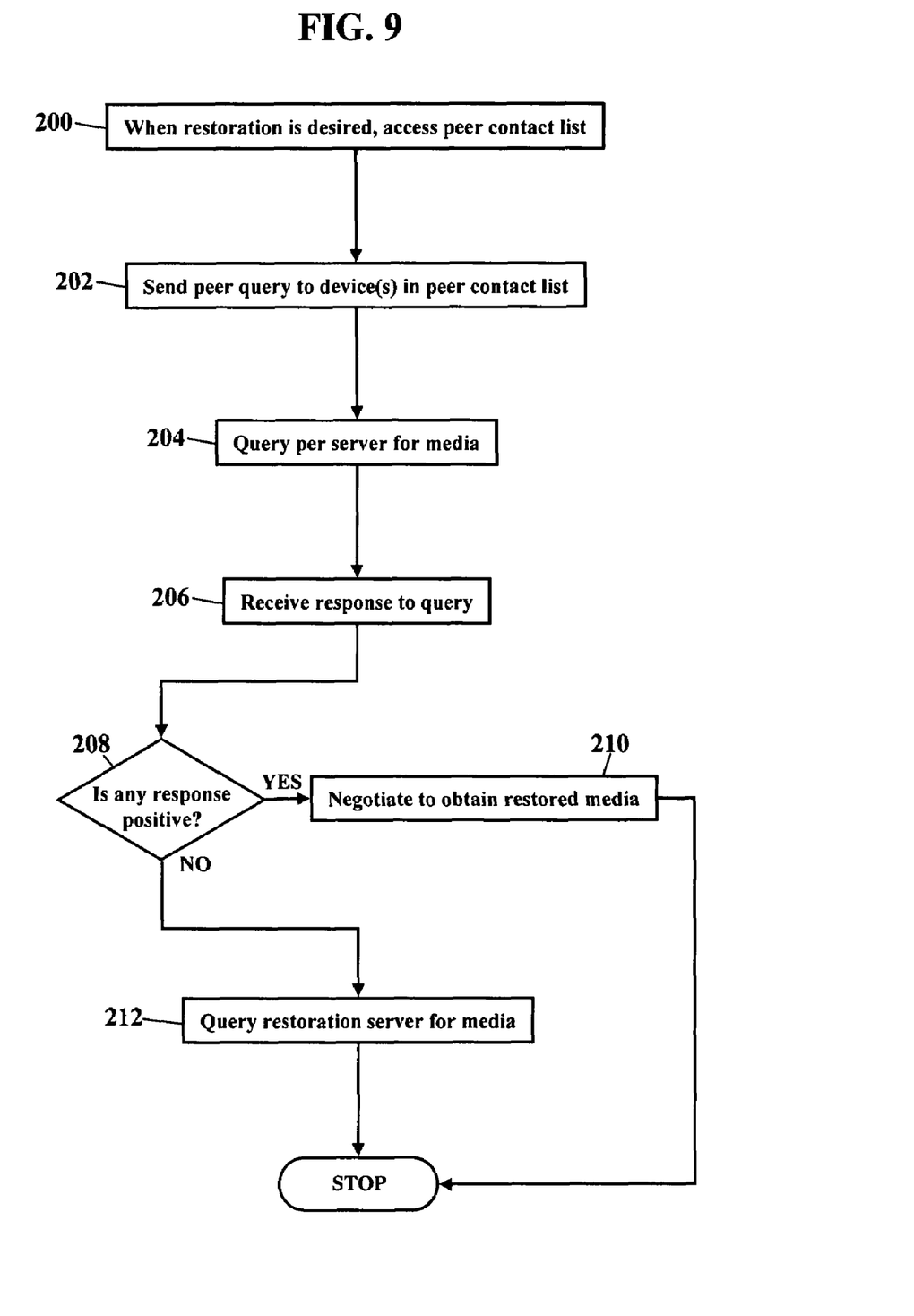
FIG. 9 is a flowchart illustrating yet another method for restoring media, according to more exemplary embodiments.

FIG. 9 is a flowchart illustrating yet another method for restoring media, according to more exemplary embodiments. When restoration is desired, a peer contact list is accessed (Block 200). A peer query is sent to each peer device (Block 202). A peer server may also be queried for the media to be restored (Block 204). Responses to the queries are received (Block 206). If the response is positive, indicating the media to be restored is obtainable (Block 208), then negotiation is then commenced to download or transfer the desired media (Block 210). If, however, the response is negative (Block 208), indicating the peer queries were unsuccessful, then a restoration server is queried for the media to be restored (Block 212). Here, because the restoration server may impose a fee for restoring media, exemplary embodiments may first attempt free peer-to-peer queries. If the desired media cannot be obtained from peer devices, then exemplary embodiments query a fee-based restoration service.

Exemplary embodiments are applicable to any communications network. The communications network 26, for example, may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include coaxial cables, copper wires, fiber optic lines, and/or hybrid-coaxial lines. The communications network 26 may even include wireless portions utilizing any portion of the electromagnetic spectrum and any signaling standard (such as the IEEE 802 family of standards).

Figure 10:
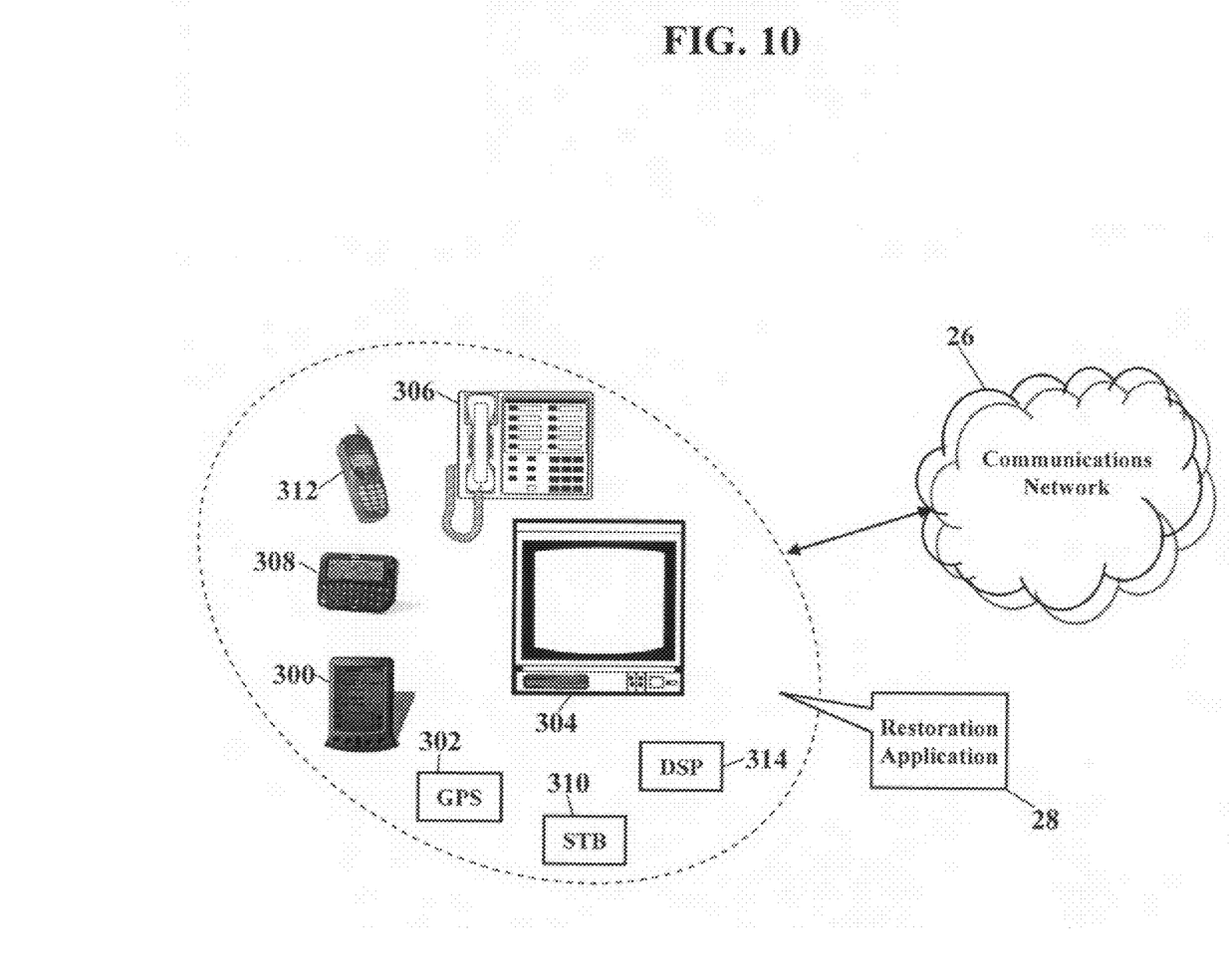
FIG. 10 is a schematic illustrating additional communications devices in which exemplary embodiments may operate.

FIG. 10 is a schematic illustrating more exemplary embodiments. FIG. 10 illustrates that the restoration application 28 may alternatively or additionally operate within various other electronic devices. FIG. 10, for example, illustrates that the restoration application 28 may entirely or partially operate within a personal digital assistant (PDA) 300, a Global Positioning System (GPS) device 302, an interactive television 304, an Internet Protocol (IP) phone 306, a pager 308, a set-top-box (STB) 310, a cellular/satellite phone 312, or any computer system and/or communications device utilizing a digital/signal processor (DP/DSP) 314. The electronic device may also include watches, radios, vehicle electronics, clocks, printers, gateways, and other apparatuses and systems. Because the architecture and operating principles of the various electronic devices are well known, the hardware and software componentry of the various electronic devices are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module— ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

The restoration application 28 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the restoration application 28 to be easily disseminated. A computer program product for restoring media comprises the computer-readable medium, and the restoration application 28 stores on the computer-readable medium as processor-executable code or instructions.

The restoration application 28 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for obtaining a communications address for restoring media, comprising:

receiving a user's media catalog;

storing the user's media catalog in a database of media catalogs;

when restoration is desired, retrieving from the user's media catalog an identity of a media file to be restored;

accessing a peer contact list listing communications addresses for peer devices;

retrieving a preferred ranking of peer communications addresses;

retrieving a first communications address from the preferred ranking;

sending a query to the first communications address to obtain an electronic copy of the media file that is available for no charge, the query comprising a restoration address to which the electronic copy is sent;

awaiting a response from the first communications address;

sequentially sending subsequent queries to each communications address in the preferred ranking to freely obtain the electronic copy of the media file;

querying a fee-based restoration service for electronic copy of the media file when the media file cannot be freely obtained from the preferred ranking;

obtaining the electronic copy of the media file; and storing the electronic copy of the media file in the user's media catalog.

2. A method according to claim 1, further comprising sending a query to the communications address to obtain the media file to be restored.

3. A method according to claim 2, further comprising receiving the media file and sending the media file to the user.

4. A method according to claim 1, further comprising brokering a transfer of the media file.

5. A method according to claim 1, further comprising receiving a request for restoration.

6. A method according to claim 1, further comprising querying a peer server for the media to be restored.

7. A system for restoring media, comprising:
a processor executing code stored in memory that causes the processor to:
receive a user's media catalog;
store the user's media catalog in a database of media catalogs;
when restoration is desired, retrieve from the user's media catalog an identity of a media file to be restored;
access a peer contact list listing communications addresses for peer devices;
retrieve a preferred ranking of peer communications addresses;
retrieve a first communications address from the preferred ranking;
send a query to the first communications address to obtain an electronic copy of the media file that is available for no charge, the query comprising a restoration address to which the electronic copy is sent;
await a response from the first communications address;
sequentially send subsequent queries to each communications address in the preferred ranking to freely obtain the electronic copy of the media file;
query a fee-based restoration service for electronic copy of the media file when the media file cannot be freely obtained from the preferred ranking;
obtain the electronic copy of the media file; and
store the electronic copy of the media file in the user's media catalog.

8. A system according to claim 7, wherein the instructions further cause the processor to send a query to the communications address to obtain the media file to be restored.

9. A system according to claim 8, wherein the instructions further cause the processor to receive the media file and send the media file to the user.

10. A system according to claim 7, wherein the instructions further cause the processor to broker a transfer of the media file.

11. A system according to claim 7, wherein the instructions further cause the processor to receive a request for restoration.

12. A system according to claim 7, wherein the instructions further cause the processor to receive a restoration address that identifies to what address the restored media is sent.

13. A computer readable medium storing processor executable instructions for performing a method, the method comprising:
receiving a user's media catalog;
storing the user's media catalog in a database of media catalogs;
when restoration is desired, retrieving from the user's media catalog an identity of a media file to be restored;
access a peer contact list listing communications addresses for peer devices;
retrieve a preferred ranking of peer communications addresses;
retrieve a first communications address from the preferred ranking;
send a query to the first communications address to obtain an electronic copy of the media file that is available for no charge, the query comprising a restoration address to which the electronic copy is sent;
await a response from the first communications address;
sequentially send subsequent queries to each communications address in the preferred ranking to freely obtain the electronic copy of the media file;
query a fee-based restoration service for electronic copy of the media file when the media file cannot be freely obtained from the preferred ranking;
obtain the electronic copy of the media file; and
store the electronic copy of the media file in the user's media catalog.

* * * * *